(12) United States Patent
Cho et al.

(10) Patent No.: US 7,382,784 B2
(45) Date of Patent: Jun. 3, 2008

(54) APPARATUS AND METHOD FOR SWITCHING BROADCAST CHANNEL USING VCC INFORMATION

(75) Inventors: Kyu-Hyung Cho, Puchon-shi (KR); Yong-Deok Kim, Seoul (KR); Sang-Ho Kim, Suwon-shi (KR); Jun-Ho Koh, Suwon-shi (KR)

(73) Assignee: Samsung Electronics Co., Ltd., Maetan-Dong, Yeong Tong-Gu, Suwon-Si, Gyeonggi-Do (KR)

( * ) Notice: Subject to any disclaimer, the term of this patent is extended or adjusted under 35 U.S.C. 154(b) by 970 days.

(21) Appl. No.: 10/682,155

(22) Filed: Oct. 9, 2003

(65) Prior Publication Data

US 2004/0228345 A1  Nov. 18, 2004

(30) Foreign Application Priority Data

May 16, 2003  (KR) ............... 10-2003-0031163

(51) Int. Cl.
  *H04L 12/28* (2006.01)

(52) U.S. Cl. .............. 370/397; 370/432; 370/486; 725/152; 725/153; 398/153

(58) Field of Classification Search ........ 370/235–236, 370/389–392, 431–437, 485–487, 397; 398/63, 398/70, 153; 725/152, 153
See application file for complete search history.

(56) References Cited

U.S. PATENT DOCUMENTS

| | | | |
|---|---|---|---|
| 6,185,228 B1 * | 2/2001 | Takashimizu et al. ...... | 370/535 |
| 6,233,255 B1 * | 5/2001 | Kato et al. .................. | 370/486 |
| 6,407,998 B1 * | 6/2002 | Polit et al. .................. | 370/365 |
| 6,434,171 B1 * | 8/2002 | Ishida ........................ | 370/537 |
| 6,796,555 B1 * | 9/2004 | Blahut ..................... | 370/395.1 |
| 6,813,283 B2 * | 11/2004 | Takashimizu et al. ...... | 370/535 |

(Continued)

FOREIGN PATENT DOCUMENTS

JP  10-209994  8/1998

*Primary Examiner*—Hassan Kizou
*Assistant Examiner*—Brian T O'Connor
(74) *Attorney, Agent, or Firm*—Cha & Reiter, LLC (57) ABSTRACT

An optical transmission network is disclosed that classifies digital broadcast channel data according to virtual channel connection (VCC) before transmission. In the optical transmission network, an optical signal receiver converts an optical signal from an optical line terminal (OLT) into an ATM cell that is classified according to the VCC. A VCC-based ATM cell classifier detects header information and a payload part from the classified ATM cell of each VCC. PID analyzers receive a payload part of an ATM cell corresponding to one VCC from the VCC-based ATM cell classifier, extract PID of each broadcast channel from digital broadcast channel data included in the payload part, and output specific broadcast channel data in the broadcast channel data included in the payload part. A switch receives broadcast channel data output from the PID analyzers and switches the received broadcast channel data to a broadcast channel desired by each subscriber. The controller updates broadcast channel information by receiving header information of the classified ATM cell of each VCC from the VCC-based ATM cell classifier, receives the broadcast channel desired by the subscriber, and controls the PID analyzers to output the desired broadcast channel according to VCC information with the desired broadcast channel included therein so that the output broadcast channel is matched to the subscriber.

9 Claims, 4 Drawing Sheets

U.S. PATENT DOCUMENTS

| | | | |
|---|---|---|---|
| 6,831,981 B2 * | 12/2004 | Edasawa et al. | 380/278 |
| 6,973,271 B2 * | 12/2005 | Farmer et al. | 398/68 |
| 7,085,279 B1 * | 8/2006 | Kumar et al. | 370/401 |
| 7,095,745 B2 * | 8/2006 | Tomizawa | 370/397 |
| 7,146,104 B2 * | 12/2006 | Farmer | 398/72 |
| 7,245,585 B2 * | 7/2007 | Sullivan et al. | 370/235 |
| 7,280,475 B2 * | 10/2007 | Tanaka et al. | 370/235 |
| 7,280,542 B2 * | 10/2007 | Hassan-Ali et al. | 370/395.1 |
| 7,283,570 B2 * | 10/2007 | Takashimizu et al. | 370/535 |
| 7,305,691 B2 * | 12/2007 | Cristofalo | 725/34 |
| 2001/0055322 A1 * | 12/2001 | Domon | 370/537 |

* cited by examiner

APPARATUS AND METHOD FOR SWITCHING BROADCAST CHANNEL USING VCC INFORMATION

CLAIM OF PRIORITY

This application claims priority under 35 U.S.C. § 119 to an application entitled "Apparatus and Method for Switching Broadcast Channel Using VCC Information," filed in the Korean Intellectual Property Office on May 16, 2003 and assigned Serial No. 2003-31163, the contents of which are incorporated herein by reference.

BACKGROUND OF THE INVENTION

1. Field of the Invention

The present invention relates generally to a broadcasting service using an optical transmission network, and in particular, to a broadcasting service using an ATM (Asynchronous Transfer Mode) optical transmission network.

2. Description of the Related Art

Conventional digital broadcasting services may deliver broadcast data to a plurality of subscribers using an optical transmission network.

A conventional analog broadcasting service delivers all the channel data to a subscriber, and the subscriber then selects a desired channel through a TV receiver or a set-top box to receive a broadcasting service. However, unlike the analog broadcasting service, the digital broadcasting service cannot transmit all the channel information to the subscriber so that he or she can select a desired channel. This is because in the digital broadcasting service, each channel is required to be transmitted at about 20 Mbps for HD (High Definition) TV and at about 3 to 6 Mbps even for SD (Standard Definition) TV. Therefore, as the number of the channels is increased, the transmission to the subscriber would require a rate of several hundreds or higher of Mbps. Therefore, it is not practical or possible to deliver all the channel information to the subscriber.

Accordingly, the digital broadcasting service receives channel information desired by a subscriber from an optical line terminal (OLT) or an optical network unit (ONU) and transmits only his or her desired channel data to the subscriber.

In this arrangement, switching between a digital broadcast channel and a subscriber for connecting the digital broadcast channel to the subscriber becomes important.

Figure 1:
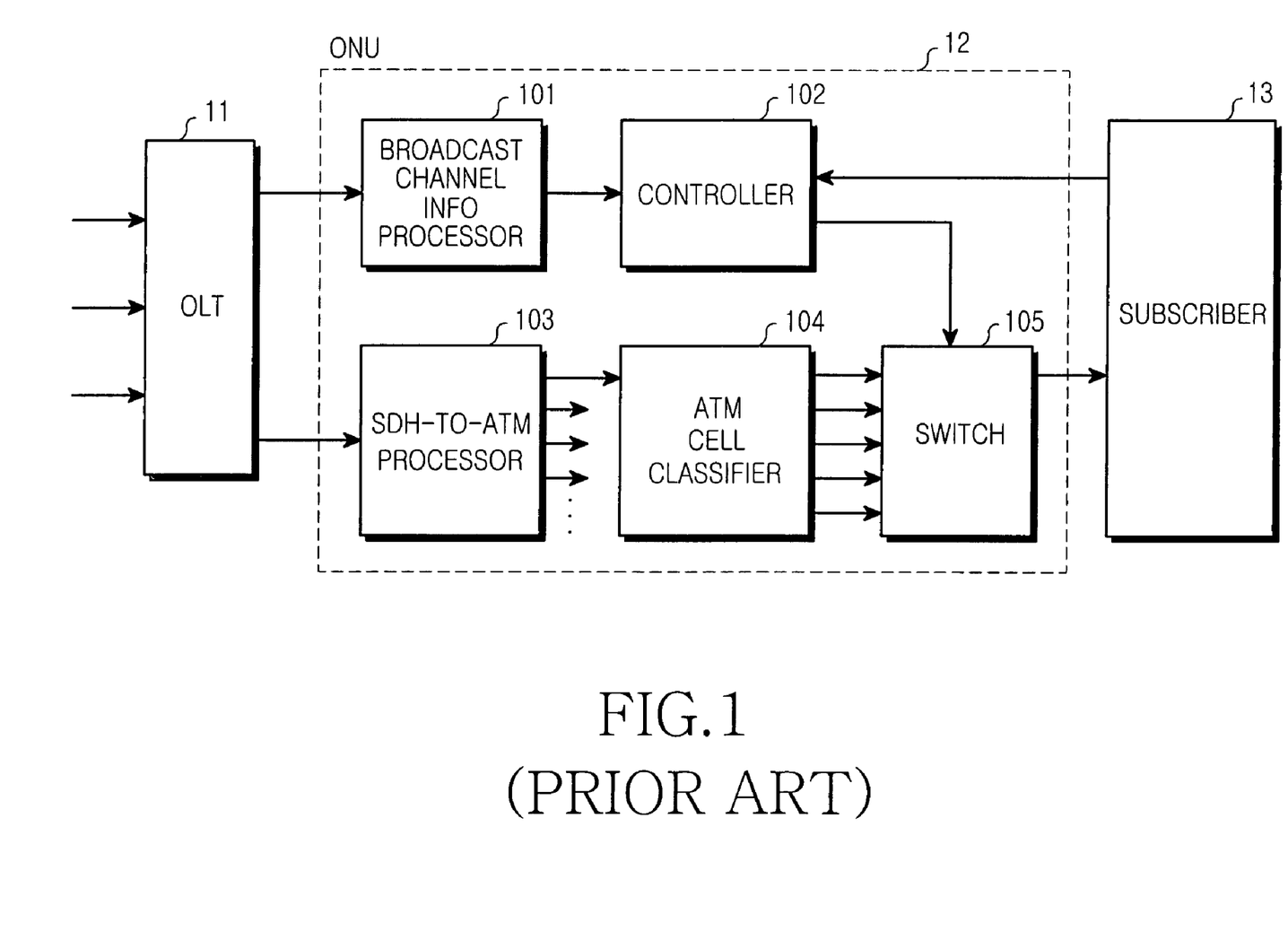
FIG. 1 illustrates a block diagram of a conventional optical transmission network for a digital broadcasting service.

FIG. 1 illustrates a block diagram of a conventional optical transmission network for a digital broadcasting service. As illustrated in FIG. 1, the conventional optical transmission network includes an optical line terminal (OLT) 11 for electro-optic converting digital broadcast data provided from a broadcasting service provider. The converted digital broadcast data are grouped into one optical signal to provide a digital broadcasting service to a subscriber 13. An optical network unit (ONU) 12 is used to deliver information from the OLT 11 to the subscriber 13. An optical cable connects the OLT 11 to the ONU 12.

The ONU 12 includes an SDH (Synchronous Digital Hierarchy)-to-ATM processor 103 for converting an optical signal including digital broadcast data received from the OLT 11 into an electric signal in an ATM format, an ATM cell classifier 104 for classifying digital broadcast data according to channels, a broadcast channel information processor 101 for processing broadcast channel information provided from the OLT 11, a controller 102 for controlling each element, and a switch 105 for switching the classified digital broadcast data of each channel to each subscriber.

In operation, each of several broadcasting service providers transmits digital broadcast data to the OLT 11 via each virtual channel connection (VCC). The VCC refers to a communication channel on a virtual path (VP) which is a path obtained by grouping several strands of channels into a sheaf. The OLT 11 converts the digital broadcast data into SDH-formatted optical signal, and transmits the SDH-formatted optical signal to the ONU 12. In the ONU 12, the SDH-to-ATM processor 103 converts the SDH-formatted digital broadcast data transmitted by the OLT 11 into an ATM-formatted digital broadcast data. The ATM-formatted digital broadcast data is classified by the ATM cell classifier 104 into digital broadcast data from each channel. The digital broadcast data from each channel is applied to the switch 105 and then switched to the subscriber 13 at the request of the subscriber 13. The digital broadcast data classified into ATM cell does not include broadcast channel information for corresponding digital broadcasting, and a broadcast channel information processor 101 is included to process such broadcast channel information.

The broadcast channel information is delivered from the OLT 11 through a separate line. The broadcast channel information delivered to the broadcast channel information processor 101 also includes broadcasting station information corresponding to a program ID (PID) contained in digital broadcast data. In this manner, it is possible to update a channel that is added, changed and deleted optionally by the OLT 11 or the broadcasting service provider.

However, the conventional method has the following two problems.

First, an increase in the number of digital broadcast channels increases the number of output channels of the ATM cell classifier 104 that classifies digital broadcast data according to broadcast channels. This means that the switch 105 must switch the increased number of channels. In general, a high-capacity switch having a large number of inputs and outputs is complicated in operation and expensive in cost. In addition, if the number of channels is increased beyond the available capacity of the switch 105, the switch 105 must be replaced with a new one, causing a service problem.

Second, in the conventional optical transmission network for digital broadcasting, each ONU has PID information for digital broadcast data of each channel through Ethernet, and the changed digital broadcast channel information is artificially updated from the OLT 11 to the ONU 12 during addition or deletion of a digital broadcast channel and rearrangement of a broadcast channel. However, during addition of a new digital broadcast channel or deletion of an existing digital broadcast channel and/or rearrangement of a broadcast channel, the changed digital broadcast channel information is artificially provided from the OLT 11 to the ONU 12. Thus, during addition of a new digital broadcast channel or deletion of an existing digital broadcast channel and/or rearrangement of a broadcast channel, the subscriber 13 may fail to receive information about the change unless the information is artificially updated to the ONU 12. In addition, the broadcast channel information is transmitted through a separate line, requiring additional hardware (e.g., line).

SUMMARY OF THE INVENTION

It is, therefore, one aspect of the present invention is to provide an apparatus and method for switching a digital broadcast channel to enable fast and smooth channel switching through VCC-based switching.

It is another aspect of the present invention is to provide a digital broadcast channel switching apparatus and method for transmitting VCC-based switching information together with broadcast channel information, and automatically updating the broadcast channel information so that an ONU can individually automatically determine switching even when addition of a new broadcast channel, deletion of an existing broadcast channel, and rearrangement of a broadcast channel occur in an OLT.

One embodiment of the invention is directed to an optical transmission network for classifying digital broadcast channel data according to virtual channel connection (VCC) before transmission. The optical transmission network includes an optical signal receiver for converting an optical signal from an optical line terminal (OLT) into an ATM (Asynchronous Transfer Mode) cell which is classified according to the VCC; a VCC-based ATM cell classifier for detecting header information and a payload part from the classified ATM cell of each VCC delivered from the optical signal receiver; a plurality of PID (Program ID) analyzers for receiving a payload part of an ATM cell corresponding to one VCC from the VCC-based ATM cell classifier, extracting PID of each broadcast channel from digital broadcast channel data included in the payload part, and outputting specific broadcast channel data in the broadcast channel data included in the payload part under the control of a controller; a switch for receiving broadcast channel data output from the PID analyzers and switching the received broadcast channel data to a broadcast channel desired by each subscriber under the control of the controller. The controller also updates broadcast channel information by receiving header information of the classified ATM cell of each VCC from the VCC-based ATM cell classifier, receiving the broadcast channel desired by the subscriber, and controlling the PID analyzers to output the desired broadcast channel according to VCC information with the desired broadcast channel included therein so that the output broadcast channel is matched to the subscriber.

Another embodiment of the invention is directed to a digital broadcast channel switching method using VCC information in an optical transmission network that classifies digital broadcast channel data according to virtual channel connection (VCC). The digital broadcast channel switching method includes the steps of: converting an optical signal provided from an optical line terminal (OLT) into an ATM cell that is classified according the VCC; updating broadcast channel information of each VCC from a header in the classified ATM cell of each VCC; storing a payload part of the classified ATM cell of each VCC, and extracting PID (Program ID) of broadcast channels included in the payload part from the stored payload part; receiving a broadcast channel desired by a subscriber, and searching information on VCC with the desired broadcast channel included therein from the updated broadcast channel information of each VCC; sending information on the desired broadcast channel to a storage corresponding to the VCC information among storages where the payload part is stored according to VCC in the step (c), based on the searched VCC information so as to output only desired broadcast channel data; and switching the output broadcast channel data so that the broadcast channel data is delivered to the subscriber.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. For the purposes of clarity and simplicity, a detailed description of known functions and configurations incorporated herein has been omitted for conciseness.

Figure 2:
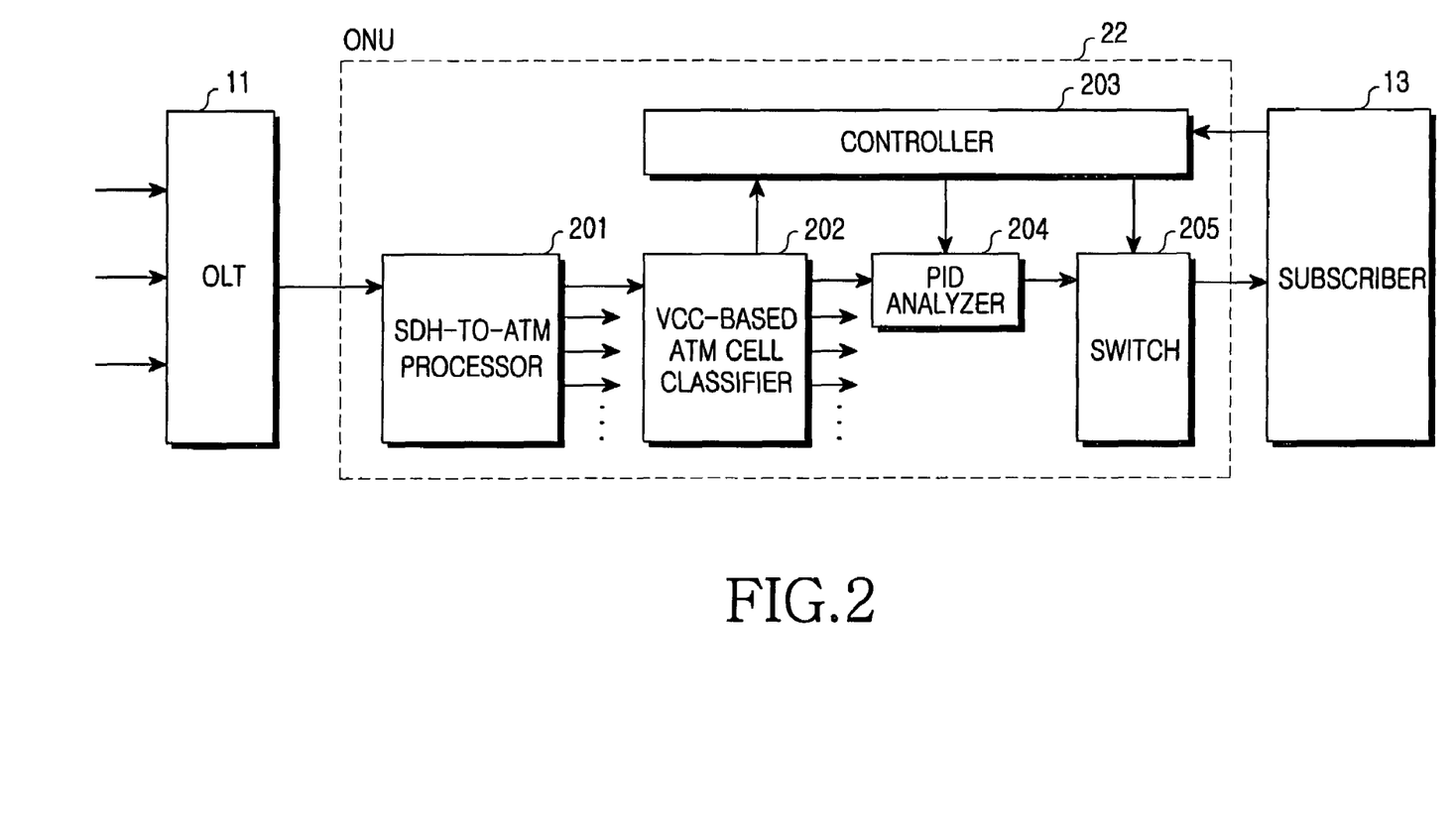
FIG. 2 illustrates a block diagram of an optical transmission network with a broadcast channel switching apparatus according to an embodiment of the present invention.

FIG. 2 illustrates a block diagram of an optical transmission network with a broadcast channel switching apparatus according to an embodiment of the present invention. As illustrated in FIG. 2, the optical transmission network includes an optical line terminal (OLT) 11 for electro-optic converting digital broadcast data provided from a broadcasting service provider and grouping the converted digital broadcast data into one optical signal to provide a digital broadcasting service to a subscriber 13, an optical network unit (ONU) 22 which is a user device for delivering information received from the OLT 11 to the subscriber 13, and an optical cable for connecting the OLT 11 to the ONU 22.

The ONU 22 includes an SDH-to-ATM processor 201 for converting an optical signal including digital broadcast data provided from the OLT 11 into an ATM-formatted electric signal, a VCC-based ATM cell classifier 202 for classifying the digital broadcast data according to VCC of each ATM cell, a PID (Program ID) analyzer 204 for analyzing PID information in the classified digital broadcast data of each VCC and outputting digital broadcast data from a corresponding channel under the control of a controller 203. The controller 203 controls each element. A switch 205 is used to switch digital broadcast data from a corresponding channel, output from the PID analyzer 204, to each subscriber 13.

In operation, several broadcasting service providers transmit digital broadcast data, e.g., MPEG2-TS (Moving Picture Experts Group 2-Transprot Stream), in an ASI (Asynchronous Serial Interface) format. Upon receiving the digital broadcast data in the ASI format, the OLT 11 searches for a start position of the digital broadcast data. This may be done with a synchronization byte of MPEG2-TS that is the received digital broadcast data. The PID information is filtered and collected for each digital broadcast channel.

In addition, the OLT 11 assembles each MPEG2-TS in an ATM cell, and assigns the assembled ATM cell to an individual VCC. The OLT 11 generates a header of a VCC frame using PID information of the assigned ATM cell of each VCC. In ATM, the term "VCC" refers to a communication channel on a virtual path (VP) which is a path obtained by grouping several strands of channels into a sheaf. Therefore, broadcast data can include several channels on one path rather than having one path for each channel. For example, Korean Broadcasting System, providing KBS1, KBS2 and EBS (Education Broadcasting System) digital broadcasting services, transmits broadcast data of the three broadcasting services with one VCC.

Figure 3:
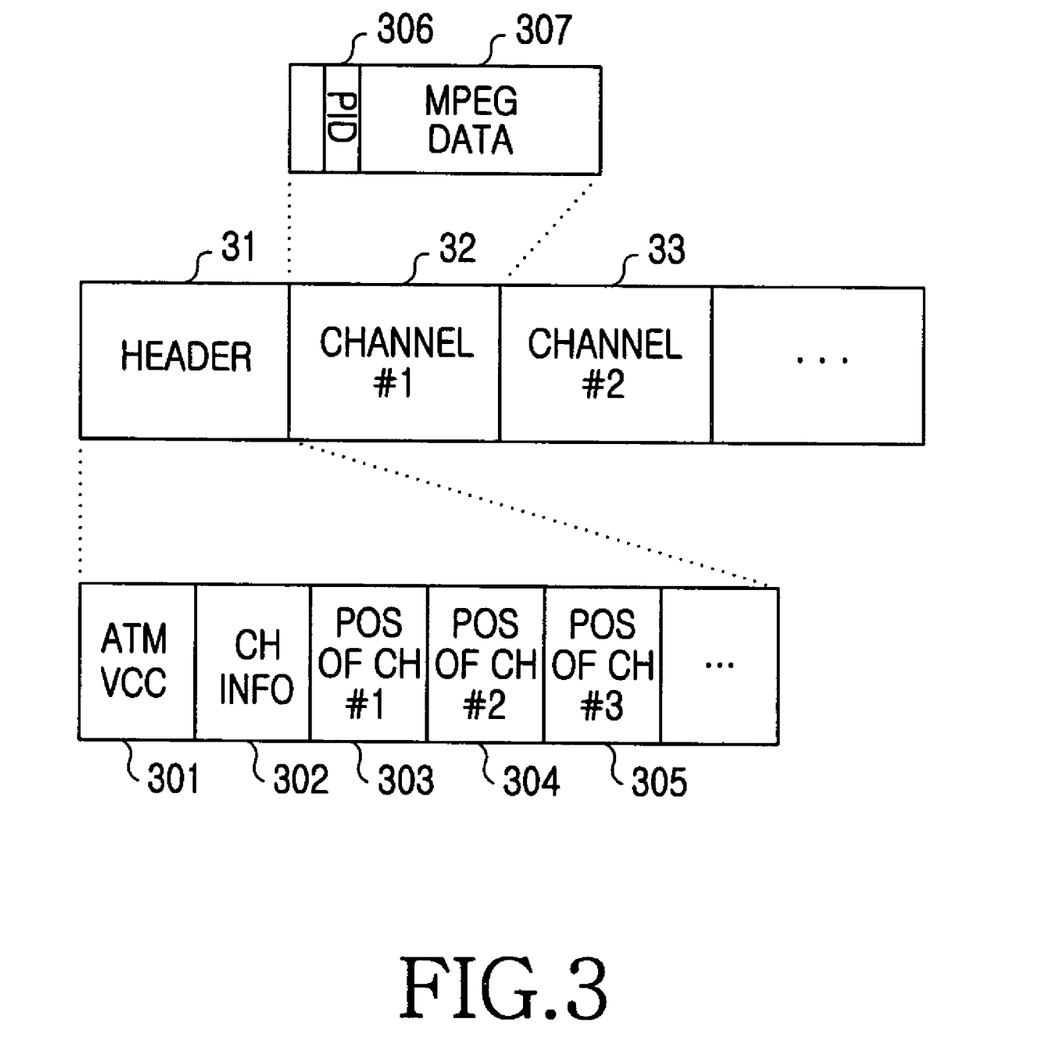
FIG. 3 illustrates a format of a VCC frame used for a digital broadcast channel switching apparatus according to an embodiment of the present invention.

A VCC frame formed in this way is illustrated in FIG. 3. FIG. 3 illustrates a format of a VCC frame used for a digital broadcast channel switching apparatus according to an embodiment of the present invention. As illustrated in FIG. 3, a VCC frame is comprised of a header field 31 and a payload part including channel fields 32 to 33 each having digital broadcast data. The header field 31 includes an ATM VCC field 301 indicating ATM VCC, a channel information field 302 having broadcasting station information corresponding to PID information in the channel fields 32 to 33 in order to indicate a change in a broadcast channel of each VCC, including addition of a new broadcast channel, deletion of an existing broadcast channel and/or rearrangement of a broadcast channel, and channel position fields 303 to 305 indicating start and end positions of the channel fields 32 to 33. The payload part is comprised of a plurality of the broadcast channel fields (e.g., 32 and 33), and each of the broadcast channel fields 32, 33 includes an MPEG data field 307 with digital broadcast data and a PID information field 306 with channel information.

The VCC frame of FIG. 3 is converted into an SDH optical signal and transmitted through an optical line. An ATM cell is separated from the SDH optical signal according to VCC frames. In addition, the OLT 11 transmits information in the channel information field 302 of the header of the VCC frame to the controller 203 so as to automatically update a change in a broadcast channel of each VCC, including addition of a new broadcast channel, deletion of an existing broadcast channel and/or rearrangement of a broadcast channel.

The ONU 22 processes the VCC frame formed in the above manner and delivers digital broadcast data to the subscriber 13. In the ONU 22, the SDH-to-ATM processor 201 converts a VCC frame transmitted by the OLT 11 in an SDH format into a VCC frame in an ATM format. The converted ATM-formatted VCC frame is classified into a header and a payload part by the VCC-based ATM cell classifier 202. In this way, the VCC-based ATM cell classifier 202 transmits information in the channel information field 302 included in the header of the VCC frame to the controller 203 so as to automatically update a change in a broadcast channel of each VCC, including addition of a new broadcast channel, deletion of an existing broadcast channel and/or rearrangement of a broadcast channel, and transmits a plurality of broadcast channel fields 32, 33 included in the payload part of the VCC frame to the PID analyzer 204.

The controller 203 automatically updates a change in a broadcast channel of each VCC by receiving information in the channel information field 302 included in the header of the VCC frame from the VCC-based ATM cell classifier 202, searches a corresponding VCC from a broadcast channel of each VCC, obtained by receiving and updating information on a broadcast channel desired by the subscriber, and transmits PID information of the broadcast channel desired by the subscriber to the PID analyzer 204. The PID analyzer 204 then outputs digital broadcast data of the corresponding broadcast channel. In addition, the controller 203 controls the switch 205 so that the corresponding digital broadcast data is connected to the subscriber 13.

The PID analyzer 204 extracts PID information included in the broadcast channel fields 32, 33 included in the payload part of the VCC frame received from the VCC-based ATM cell classifier 202, receives PID information of output broadcast data from the controller 203, and provides the corresponding broadcast data to the switch 205. In this way, the VCC frame classified according to VCC has digital broadcast data of several broadcast channels, and the PID analyzer 204 provides the switch 205 with only the digital broadcast data of a broadcast channel selected by the subscriber 13 among digital broadcast data of several broadcast channels included in the VCC frame.

The switch 205 switches digital broadcast data output from the PID analyzer 204 under the control of the controller 203 so that the digital broadcast data is matched to the subscriber 13.

Compared with the conventional structure where every channel is subject to switching, the features of this embodiment of the present invention reduce the number of switching operations and update channel information without additional hardware elements.

Figure 4:
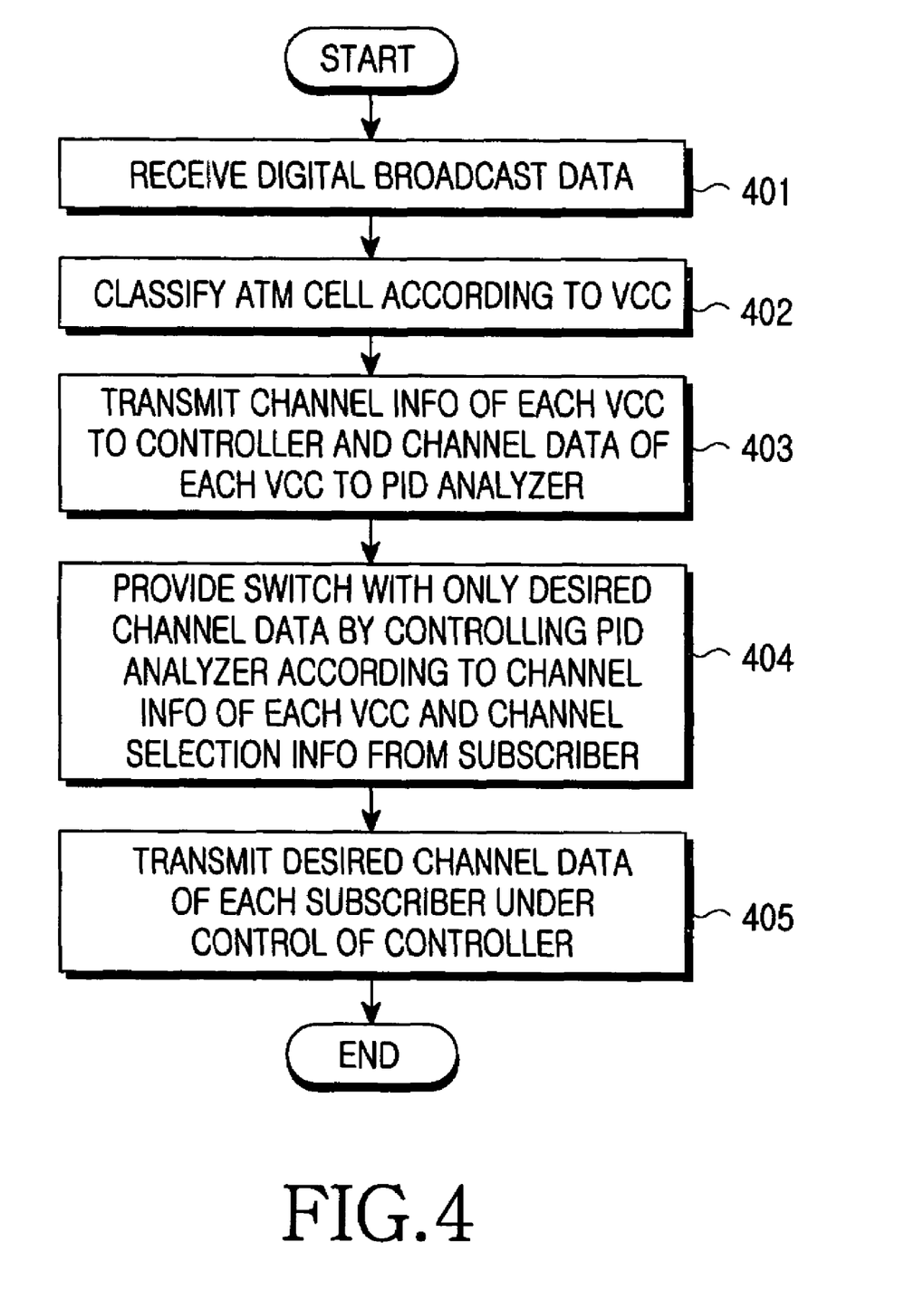
FIG. 4 is a flowchart illustrating a method for switching a digital broadcast channel in an ONU according to an embodiment of the present invention.

FIG. 4 is a flowchart illustrating a method for switching a digital broadcast channel in an ONU according to an embodiment of the present invention. Referring to FIG. 4, upon receiving SDH-formatted broadcast data (Step 401), the ONU 22 converts the SDH-formatted broadcast data into an ATM cell and classifies the converted ATM cell according to VCC (Step 402). In addition, the ONU 22 transmits channel information of each VCC (channel information field 302 of FIG. 3) extracted during classification according to VCC to the controller 203 to thereby automatically updates broadcast channel information. Further, the ONU 22 sends VCC channel data filled with digital broadcast data of a channel included in VCC to the PID analyzer 204 (Step 403).

The controller 203 receives broadcast channel information desired by the subscriber 13, checks VCC of the desired broadcast channel in the broadcast channel information updated in the step 403, and transmits the desired broadcast channel information to the PID analyzer 204 of the corresponding VCC.

The PID analyzer 204 extracts PID information of broadcast channels included in channel data of each VCC, provides the switch 205 with only the broadcast channel data corresponding to the broadcast channel information desired by the subscriber 13 among PID information extracted from the information on a broadcast channel desired by the subscriber 13 form the controller 203 so as to transmit the desired channel data to each subscriber (Step 405).

As described above, aspects of the present invention enable fast and smooth channel switching by VCC-based switching. In addition, since channels can be selected according to VCC before broadcast channel data is applied to the terminal switch, it is possible to reduce specifications of the switch.

In addition, various embodiments of the present invention can transmit VCC-based switching information together with broadcast channel information, and automatically update the broadcast channel information. This means that the ONU can individually and automatically determine switching even when addition of a new broadcast channel, deletion of an existing broadcast channel and/or rearrangement of a broadcast channel occurs in the OLT.

Embodiments of the present invention can be realized with a program and then stored in a recording medium, such as CD-ROM, RAM, floppy disk, hard disk, and optical magnetic disk, all of which can be read with a computer.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for classifying digital broadcast channel data according to virtual channel connection (VCC), comprising:

an optical signal receiver for converting an optical signal from an optical line terminal (OLT) into an ATM (Asynchronous Transfer Mode) cell that is classified according to the VCC;

a VCC-based ATM cell classifier for detecting header information and a payload part from the classified ATM cell of each VCC delivered from the optical signal receiver;

a controller;

a plurality of PID (Program ID) analyzers for receiving respective payload parts of an ATM cell corresponding to one VCC from the VCC-based ATM cell classifier, extracting PID of each broadcast channel from digital broadcast channel data included in the payload part, and outputting broadcast channel data in the broadcast channel data included in the payload part under the control of the controller; and a switch for receiving broadcast channel data output from the PID analyzers and switching the received broadcast channel data to a broadcast channel desired by a subscriber under the control of the controller, wherein the controller updates broadcast channel information by receiving header information of the classified ATM cell of each VCC front the VCC-based ATM cell classifier, receives the broadcast channel desired by the subscriber, and controls the PID analyzers to output the desired broadcast channel according to VCC information with the desired broadcast channel included therein so that the output broadcast channel is matched to the subscriber.

2. The apparatus of claim 1, wherein the header information comprises:

an ATM VCC field indicating that the classified ATM cell of each VCC is an ATM VCC;

a channel information field including broadcasting station information corresponding to PID information of each broadcast channel field included in a payload part of the classified ATM cell of each VCC to indicate a change in a broadcast channel of each VCC, including addition of a new broadcast channel, deleting of an existing broadcast channel and rearrangement of a broadcast channel; and one or more channel position fields indicating start and end positions of each broadcast channel field.

3. The apparatus of claim 1, wherein the controller is arranged to perform:

a first function of updating broadcast channel information by receiving header information of the classified ATM cell of each VCC from the VCC-based ATM cell classifier;

a second function of receiving a broadcast channel desired by the subscriber, searching VCC information with the desired broadcast channel included therein from the updated broadcast channel information, transmitting an output signal for the desired broadcast channel to the PID analyzer based on the corresponding VCC information, and outputting the desired broadcast channel; and a third function of controlling the switch so that a broadcast channel output by the second function is matched to the subscriber.

4. A digital broadcast channel switching method that classifies digital broadcast channel data according to virtual channel connection (VCC), comprising the steps of:

(a) converting an optical signal provided from an optical line terminal (OLT) into an ATM cell that is classified according the VCC;

(b) updating broadcast channel information of each VCC from a header in the classified ATM cell of each VCC;

(c) storing a payload part of the classified ATM cell of each VCC, and extracting PID (Program ID) of broadcast channels included in the payload part from the stored payload part;

(d) receiving a broadcast channel desired by a subscriber, and searching information on VCC with the desired broadcast channel included therein from the updated broadcast channel information of each VCC;

(e) sending information on the desired broadcast channel to a storage device corresponding to the VCC information among storages where the payload part is stored according to VCC in the step (c), based on the searched VCC information so as to output only desired broadcast channel data; and (f) switching the broadcast channel data output in step (e) so that the broadcast channel data is delivered to the subscriber.

5. The digital broadcast channel switching method of claim 4, wherein the classified ATM cell of each VCC comprises:

an ATM VCC field indicating that the classified ATM cell of each VCC is an ATM VCC;

the header including a channel information field having broadcasting station information corresponding to PID information in each broadcast channel field included in the payload part to indicate a change in a broadcast channel of each VCC, including addition of a new broadcast channel, deletion of an existing broadcast channel and rearrangement of a broadcast channel, and a channel position field indicating start and end positions of the broadcast channel field; and the payload part including a plurality of broadcast channel fields.

6. The digital broadcast channel switching method of claim 5, wherein the broadcast channel field comprises:

an MPEG (Moving Picture Experts Group) data field filled with digital broadcast data; and a PID information field field with channel information of the MPEG data field.

7. A computer-readable medium comprising executable code to classify digital broadcast channel data according to virtual channel connection (VCC), the code when loaded in a processor causes the processor to:

update broadcast channel information of each VCC from a header in an ATM cell that is classified according the VCC;

store a payload part of the classified ATM cell of each VCC, and extracting PID (Program ID) of broadcast channels included in the payload part from the stored payload part;

receive a broadcast channel desired by a subscriber, and searching information on VCC with the desired broadcast channel included therein from the updated broadcast channel information of each VCC;

send information on the desired broadcast channel to a storage device corresponding to the VCC information among storages where the payload part is stored according to VCC, based on the searched VCC information so as to output only desired broadcast channel data; and switch the output broadcast channel data so that the broadcast channel data is delivered to the subscriber.

8. The medium of claim 7, wherein the classified ATM cell of each VCC comprises:

an ATM VCC field indicating that the classified ATM cell of each VCC is an ATM VCC;

the header including a channel information field having broadcasting station information corresponding to PID information in each broadcast channel field included in the payload part to indicate a change in a broadcast channel of each VCC, including addition of a new broadcast channel, deletion of an existing broadcast channel and rearrangement of a broadcast channel, and a channel position field indicating start and end positions of the broadcast channel field; and the payload part including a plurality of broadcast channel fields.

9. The medium of claim 8, wherein the broadcast channel field comprises:

an MPEG (Moving Picture Experts Group) data field filled with digital broadcast data; and a PID information field filled with channel information of the MPEG data field.

* * * * *